United States Patent [19]

Fuchs et al.

[11] Patent Number: 4,787,473
[45] Date of Patent: Nov. 29, 1988

[54] SOUND ATTENUATING BOX

[75] Inventors: Helmut V. Fuchs, Weil; Ulrich Ackermann, Stuttgart; Norbert Rambausek, Weil der Stadt/Merklingen, all of Fed. Rep. of Germany

[73] Assignee: Fraunhofer Gesellschaft, Munich, Fed. Rep. of Germany

[21] Appl. No.: 925,023

[22] PCT Filed: Jan. 30, 1986

[86] PCT No.: PCT/EP86/00039
§ 371 Date: Nov. 13, 1996
§ 102(e) Date: Nov. 13, 1986

[87] PCT Pub. No.: WO86/04668
PCT Pub. Date: Aug. 14, 1986

[30] Foreign Application Priority Data
Feb. 7, 1985 [DE] Fed. Rep. of Germany ....... 3504208

[51] Int. Cl.⁴ .................... E04F 17/04; F01N 1/02
[52] U.S. Cl. .................... 181/224; 181/286; 181/288; 181/290
[58] Field of Search ........... 181/224, 285–288, 181/292, 293, 290

[56] References Cited

U.S. PATENT DOCUMENTS

| | | | |
|---|---|---|---|
| 3,380,206 | 4/1968 | Barnett | 181/292 X |
| 3,834,487 | 9/1974 | Hale | 181/292 |
| 3,983,955 | 10/1976 | Vasiligevic | 181/285 |
| 4,084,366 | 4/1978 | Saylor et al. | 181/292 X |
| 4,301,890 | 11/1981 | Zalas | 181/291 X |
| 4,317,503 | 3/1983 | Soderquist et al. | 181/290 |
| 4,410,065 | 10/1983 | Harvey | 181/292 X |

FOREIGN PATENT DOCUMENTS

| | | |
|---|---|---|
| 144318 | 4/1966 | France . |
| 2300384 | 9/1976 | France . |
| 2441692 | 6/1980 | France . |
| 2005384 | 4/1979 | United Kingdom . |

Primary Examiner—Benjamin R. Fuller
Attorney, Agent, or Firm—Ralf H. Siegemund

[57] ABSTRACT

The propagation of sound in flow channels is attenuated by a sound attenuating box comprised of cell-like chambers each with a bottom, an outer plate and a partition with an opening spaced from the outer plate such that the Helmholtz resonator established by the sub-chamber between the bottom and the partiton as well as by the opening is positively coupled to the outer plate as far as vibrations in the audible range are concerned through air flow through the openings and in the sub-chamber between partition and outer plate. The chambers share appropriately side walls, bottoms, partitions as well as aperture plates, and outer plates.

26 Claims, 10 Drawing Sheets

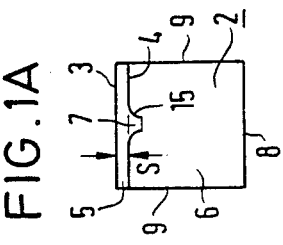
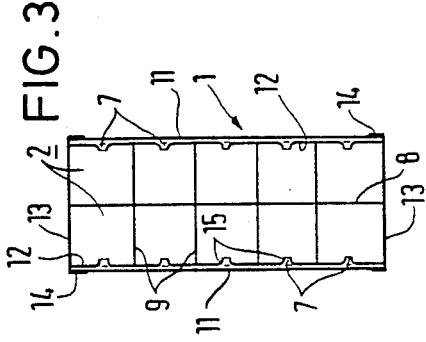
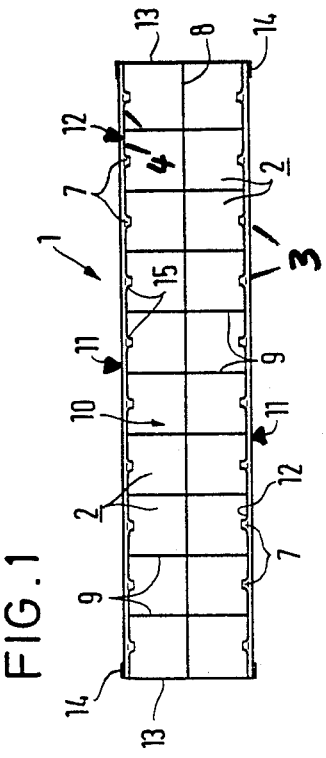
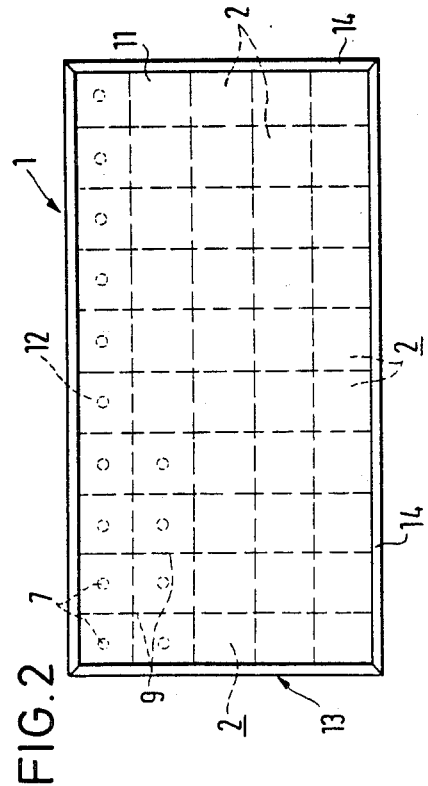

SOUND ATTENUATING BOX

BACKGROUND OF THE INVENTION

The present invention relates to a sound attenuating box, particularly for the attenuation of sound waves which propagate within a fluid flowing in channels such as venting ducts. Such a sound attenuation box of the type to which the invention pertains, includes (a) at least one closed chamber establishing a cavity which is bounded on one side by an outer plate which can be stimulated to undergo vibrations in the audible range; and (b) at least one inner plate is arranged in the cavity of the chamber, running essentially parallel to the aforementioned outer plate, and partioning the cavity into two hollow chambers, which, however, are interconnected through a passage aperture traversing the internal plate. This passage aperture together with that partial chamber being separated by the inner from the outer plate, will constitute a so-called Helmholtz resonator that is tuned to vibrations in the audible range.

Industrial as well as home equipment provides for the transportation of air, exhaust fumes or the like through flow channels, containers, as well as openings. Such flow channels constitute frequently a very undesired transmission path for sound in air between the rooms interconnected by these flow channels. In particular, flow channels will transmit the noise produced by the flow generator itself, for example, a blower into otherwise closed rooms.

A rather effective sound attenuation can be obtained in such cases, in that the flow channels are covered with a sound absorbing lining. Upon utilizing a homogeneous lining of this type, the sound attenuation obtained therewith is proportional to the degree of absorption by the lining and the length of the flow channel as well as to the ratio between the circumference and the free cross-sectional areas of the flow channel. If technically realizable, the ratio between the periphery and the cross-sectional area of the free flow channel, is increased as much as possible through the insertion of additional sound absorbing partitions into the flow channel. Moreover, through this feature, the effective flow channel width is favorably reduced, because this width should always be significantly smaller than the wave length of the sound. The pressure drop produced through this kind of sound attenuation, however, must be kept as low as possible because otherwise a higher blower power has to be compensated, and that, in turn, entails a higher sound emission. These sound attenuation devices must, therefore, not exceed a particular thickness and should offer very little resistance to the flow.

In order to reduce to a minimum the friction losses which occur on the surface of the sound absorbing layer, as well as on the sound attenuating elements, it is desirable to make these surfaces completely planar, homogeneous, and smooth, i.e. without any apertures, steps, jumps, or the like.

Whenever precipitation deposits from the flow medium are to be expected, such as it may occur in air, gas, or vapor, then the sound absorbing element should not accept these deposits in any manner whatever, because deposits on the outside would not only increase the friction losses but, in the case of the usual sound absorber, their acoustic effectiveness would be considerably reduced. Even more important, however, is that the penetration of material from the flow medium into the interior of the sound absorber has to be avoided because these materials, when penetrating the absorber, will accumulate therein and, therefore, unfavorably interfer with the effectiveness of the sound absorber, or there may even be chemical reactions or other undesirable interactions. Hence, such a penetration of material should be avoided under all circumstances. For these reasons, as well as other important reasons having to do with safety technology such as fire proofing or hygenic-health aspects, it is desirable to provide an all around, particularly gas and water proof sealing of the sound absorbing lining elements as between the flow channels and the adjoining rooms.

In order to insure a long use life and a lasting sealing of the sound attenutating elements, at least their outer skin or shell, should be chemically, as well as mechanically, resistant as much as possible. The sound attenuating element should not just stand in the flow of fluid in the flow channel as a kind of a sensitive intruder, but should, so to speak, harmonically merge in the construction of the entire flow system. Therefore, the material for the sound attenuating elements should as much as possible be matched to the material used for the flow channel walls. Particularly a construction made of sheet metal would be highly desirable. Moreover, the sound attenuating elements should be sufficiently stable so that even in the case of a long transport from the manufacturer to the final destination, they will survive even rather rough conditions of handling, and after installation, even in case of loads by the flow or in case of shaking through the flow producing and conveying device, the same attenuating should withstand such load. On the other hand, their weight should be as low as possible, particularly in view of the required assembly, as well as for reasons of statics.

In many instances, therefore, a sound attenuation construction would be particularly adantageous if the sound absorbing material were not arranged within a frame of stably constructed frame that has to be held in addition and protected against damage, by the flow of material, but wherein the sound absorbing parts individually or in combination, can take over load bearing and stiffening functions, i.e. it would be of advantage if the attenutation carrying parts of the sound attenuation structure could also contribute to the sound absorption itself. The known sound attenuators do not even come close to fulfilling all of these requirements.

In addition, for example, in case of venting equipment, there is a typical situation, which, in view of the sound absorbing range is of particular importance. This condition is to be seen in that high and medium frequencies will be attenuated in long flow channels, even without or with very simple sound absorbing features, as applied to the walls of the flow channels. However, lower frequencies, i.e. frequencies below 500 cps pose frequently difficulties. In addition, the noise spectrum of blowers has typically already at the point of sound emission, a characteristic that drops with frequency. The situation is quite similar generally with aerodynamically produced noise in the flow channels which occur also mostly at lower frequencies. Even if the so-called A-evaluation is carried out for matching to the ear, very often frequencies in the range of 250 cycle/sec, remain dominant at the point of emission.

Actually, one should expect that under these circumstances, one should use sound attenuators which are tuned preferably to the low frequencies. Instead, however, one finds predominantly sound attenuation which have their largest effectiveness well above the dominating frequency range encountered. The reason for this is, simply stated, that the porous of fibrous material used for the sound absorber, are constructively similar, quite proven, and can safely be installed. Even though the attenuation of low frequencies by means of porous sound absorbers is made possibly only whith very thick sound attenuating elements. These advantages have been put up with in practice, but particularly the disadvantage of a large volume of the resulting construction and, therefore, undesirable high pressure losses.

In accordance with the state of the art, sound attenuators are generally conceived for a universal application in sound attenuation covering a large variety of noise sources, with very different composition as far as the participating sound frequencies are concerned. For these applications which are not specifically tuned to a specific noise spectrum, a lining is preferably used in accordance with the state of the art which in as wide as possible a frequency range, guarantees a rather high and constant sound attenuation. However, as was outlined above, there is a large area, particularly in the field of venting in which the conventional sound absorbers simply have their maximum effectiveness in a frequency range quite far from the desirable frequency range, and are thus used only at marginal effectiveness. That, in turn, has lead to the fact that sound attenuators for this application are in rather senseless manner not rated and selected or designed in accordance with the attenuation maximum they can achieve, but instead, only as to their attenuation at a 250 cps frequency.

The sound absorbing construction part which is made without the utilization of porous sound absorbing material and possesses the features (a) and (b) mentioned above is, for example, disclosed by the applicant-assignee in German patent application No. P 34 12 432, filed Apr. 3, 1984. This sound absorbing construction element is made of individual twin cup-shaped sound absorbing elements which have two nested cup elements, whereby the cup opening of the inner one of the elements is covered by means of a, preferably planar foil, and is particularly and to a substantial degree closed in a sound proofing fashion. Between the side walls of the two nested cup elements a gap is formed which establishes the sound absorbing air or gas layer for bending mode vibrations in the audible frequency range and involving the side wall of the outer and/or the inner cup element. The inner cup element is not as high as the outer cup element, and the bottom of the inner cup element is provided with a neck-like passage opening, having a cross-section and a length such that the resonating frequency of the neck-shaped passage opening corresponds to the Helmholtz resonator frequency in the audible range, and involving the volume of the inner cup element as well as the volume bounded by the outer cup element and by the bottom of the inner cup element. This sound absorbing construction element combines a broad band sound absorption characteristics with a sound attenuation device which is particularly attuned to low frequencies as they occur on account of the blades of a blower, so that it seems to be quite suitable for attenuating sound waves as they propagate in the flow channels, for example, in case of venting channels. However, this device is of rather complex construction so that for reasons of cost, it will not be used in all points where it is usable. Moreover, this attenuator is not provided with completely smooth boundary surfaces so that for reasons of possible depositing of material from the flow limits its usefulness.

DESCRIPTION OF THE INVENTION

It is an object of the present invention to propose a sound absorbing construction element using the kind disclosed in the aforementioned German patent application No. P 34 12 432 of applicant-assignee as point of departure and to configure this element so that it is as constructed as simple as possible; does not admit any deposits from the flow material; will cause only small pressure losses in the flow channels in which it is inserted; is safe with regard to fire danger, excludes all hygenic-health dangers; possesses a good resistance against mechanical and chemical loads and agression, is highly stable mechanically; and has only low weight and occupies a comparatively small space. Moreover, the sound attenuator provided as per the invention, will hereinafter be designated a sound attenuating box and meets all the requirements, or at least many of those requirements mentioned in the introduction in connection with the element proposed in the printed application No. P 34 12 432, while drawbacks are avoided and particularly these requirements should be met in a better fashion that the predominant porous sound absorbers, while the drawbacks of other known sound absorbers are to be avoided.

The object is obtained in a sound attenuator box of the type mentioned in the introduction by operation of the invention in that a small distance between inner plate and outer plate is provided, so that the vibrations of the outer plate on the one hand and of the Helmholtz resonator, defined by the partial chamber facing away from the outer plate and the opening in the inner plate on the other hand, are positively coupled, resulting from air or gas flows as induced by the osciallation in the space between the inner and outer plates, as well as such flows in the opening.

By means of this positive coupling, to be explained more fully below with reference to the description of the drawings, and which constitutes a decisive step beyond the teaching of German printed patent application No. P 34 12 432.2 of applicant assignee, one obtains not only a considerable widening of the particularly effective frequency range of sound absorption by the inventive sound attenuator box, but this positive coupling permits, as compared with the content of patent application No. P 34 12 432.2, the replacement of the individual descrete twin cup-shaped sound absorbing elements wherein the bottoms of the outer cup elements are attuned as far as eigen rosonance within the sound absorption range of interest are concerned, by the integrated total structure having improved sound absorption capability in the lower as well as in the entire frequency range, the structure having completely planar homogeneous and smooth outer surfaces. This improvement is specifically obtained through a sound attenuator box having a plurality of juxtaposed chambers of a basic design and configuration as outlined above, and which in furtherance of the invention is characterized in that the outer plates of several laterally juxtaposed chambers whereby preferably all lateral juxtaposed chambers are constituted by a common single piece cover plate.

The aforementioned positive coupling causes the individual zones of the common single piece cover plate being situated above the passage openings of the inner plate and their environment, to osciallate just as individual cover plates would do, namely at a plurality of frequencies, so that for these frequencies a corresponding sound absorption obtains, whereby through the effect of the Helmholtz resonator in conjunction with the positive coupling, one obtains a particularly good sound absorption in the lower frequency range, i.e. between 100 and 500 cps. Herein, it is not required to fasten the common, single piece cover plate to the lateral chamber walls of the individual chambers, rather these lateral chamber walls do have to extend in a quite advantageous manner just to the inner plate. This feature makes possible to configure the inventive sound attenuator box in a particular advantageous configuration having a plurality of juxtaposed chambers, in that the inner plates of several laterally juxtaposed chambers, preferably of all laterally juxtaposed chambers, is constituted by a single piece aperture plate.

A particularly high effectiveness and space utilization can be obtained by means of the sound attenuator box in accordance with the invention in that two arrangements, each comprised of a plurality of laterally juxtaposed chambers, are combined in a kind of twin strata arangement, wherein the chambers of the two arrangements of juxtaposed chambers, are combined at their respective rear ends. The laterally juxtaposed chambers may have common side walls so that the surface of one of the side walls faces one of the juxtaposed chambers, and the other surface of the side walls faces in partial limits the other juxtaposed chamber. Correspondingly, those chambers whose back sides are adjacent to each other, may be configured to have a common bottom, so that the chamber bottoms of the aforementioned double strata arrangement is constituted by a common plate, upon which then the two strata of juxtaposed chambers are arranged back to back.

A still further facilitation obtains as far as construction is concerned, in that the common side walls are established by a cell-like skeleton structure, resembling a honeycomb configuration. The skeleton structure, moreover, can be configured that the common chamber bottoms are also established by that skeleton structure.

A particularly smooth and favorable configuration as far as specifics of flow dynamics are concerned, obtains in furtherance of the invention for the aforementioned inventive construction of a sound absorber box, if a plurality of chambers are embraced by a common frame which seals tight the cover plate or plates, as far as a flow medium is concerned, vis-a-vis the environment.

In view of the aforementioned requirements concerning favorable flow conditions of the outer skin of the sound attenuator box, it is to be preferred that the cover plates have a completely smooth and plane, preferably metallic, outer surface. Particularly easy manufacturable and stable structures obtain in conjunction with other advantages to be mentioned more fully below, in that in a preferred embodiment of the inventive sound attenuating box all of the aforementioned parts of that box are made of the same material, particularly a synthetic material or metal, preferably aluminum or an aluminum alloy. In addition, it is preferred to have the thickness values of the outer plate and of the inner plate to be similar as far as the order of magnitude is concerned, and both are preferably smaller than the distance between the outer plate and the inner plate, so as to obtain a good sound absorption.

Finally, the sound absorption capability of the inventive sound attenuator box in dependence upon frequency is variable within certain desirable limits in that the passage opening is provided with a neck facing away from the outer plate, and establishing a flow channel.

BRIEF DESCRIPTION OF THE DRAWINGS

The aforementioned, as well as other advantages and features of the invention, will be more fully explained in the following with reference to the figures of the drawings in connection with a few particularly advantageous embodiments of an inventive sound absorber box, as well as in conjunction with comparative measurements:

FIG. 1 is a longitudinal section through a particularly preferred embodiment of an inventive sound attenuation box;

FIG. 1A is a section through a functional or elemental unit of a sound attenuator box;

FIG. 2 is a top view of the sound attenuator box shown in FIG. 1, or a bottoum view, because both views are similar, whereby several passage openings are shown in dash line in the aperture plate being covered in FIG. 2, also indicated are side walls of the several chambers of the sound attenuator box;

FIG. 3 is a cross-section through the sound attenuator box shown in FIGS. 1 and 2;

Figure 1B:
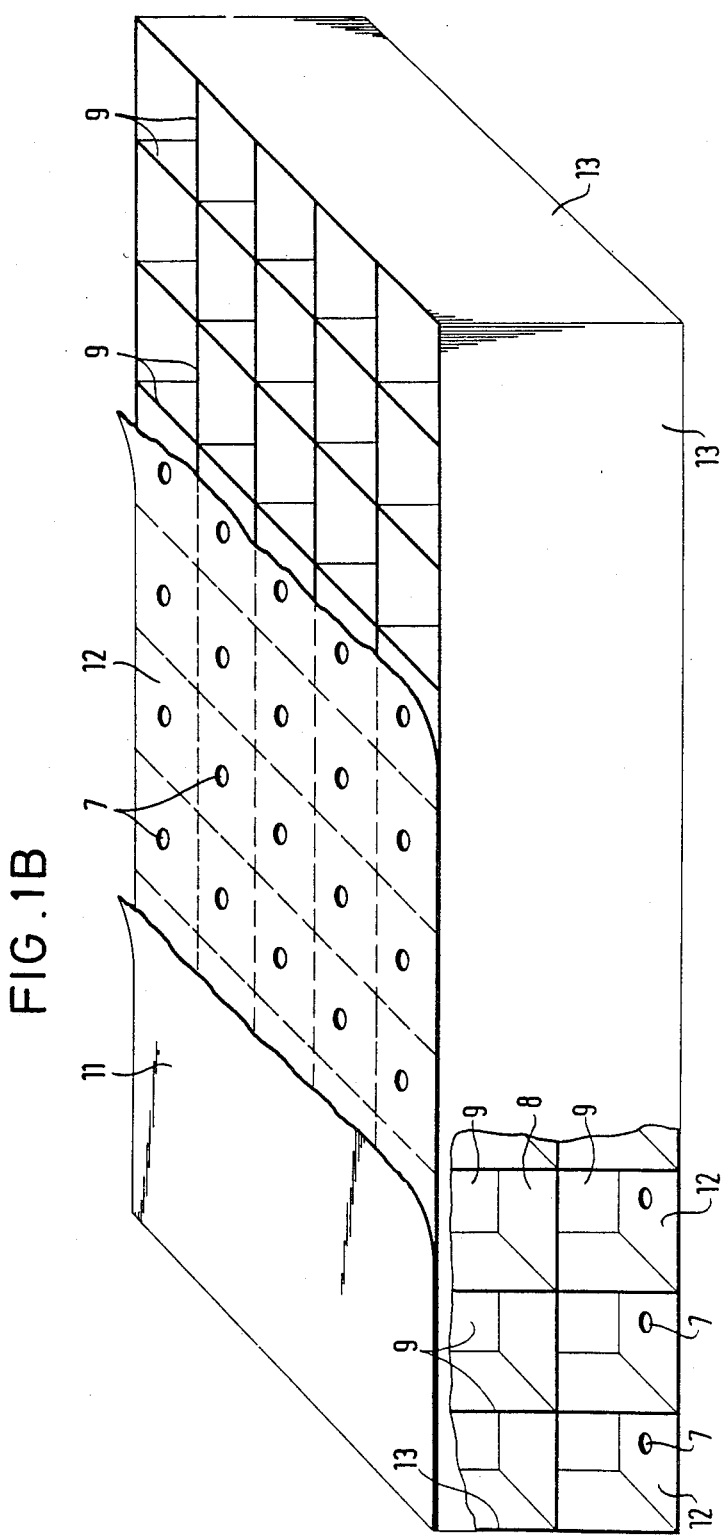
FIGS. 1B through 1D are perspective views of a sound attenuator box as per FIGS. 1-3, whereby, for reasons of illustration, certain parts have been broken off, and/or are cut off.
Figure 1C:
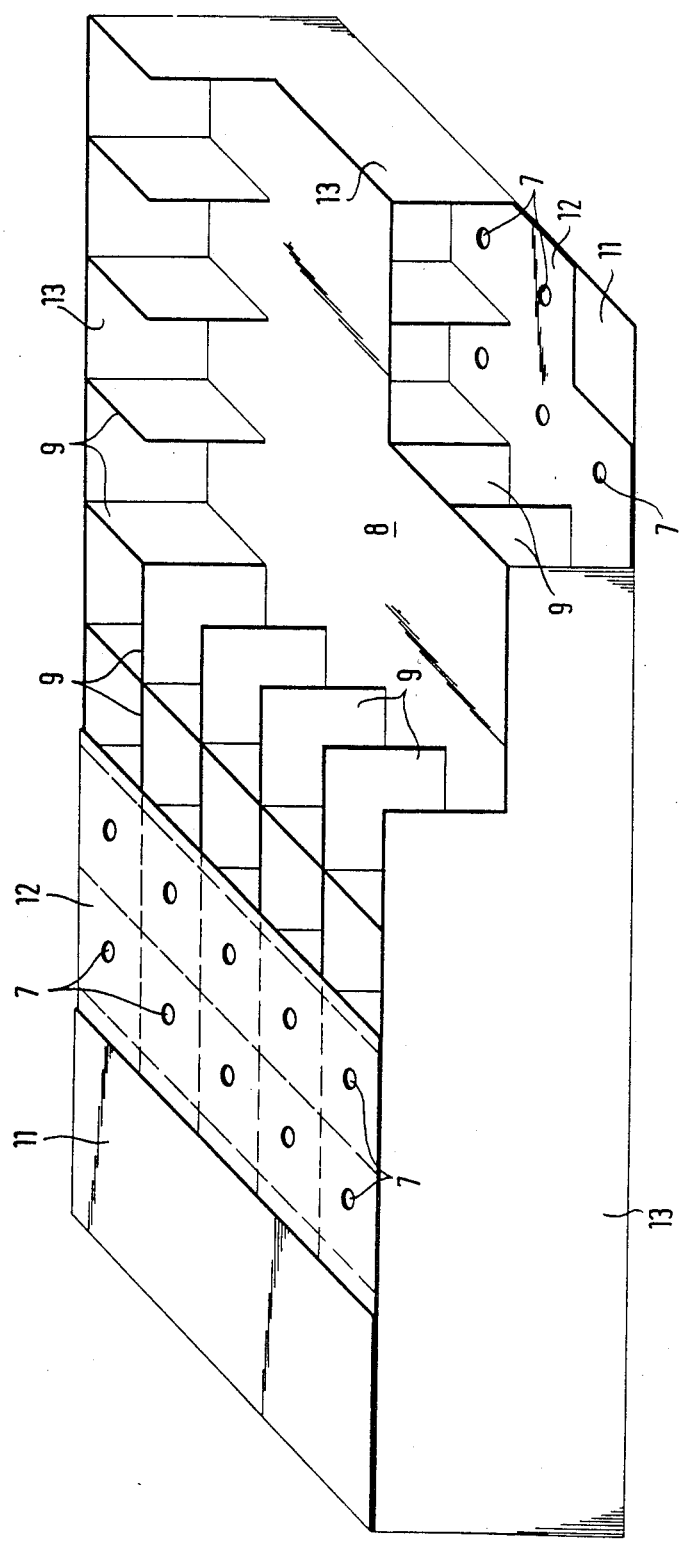
Figure 1D:
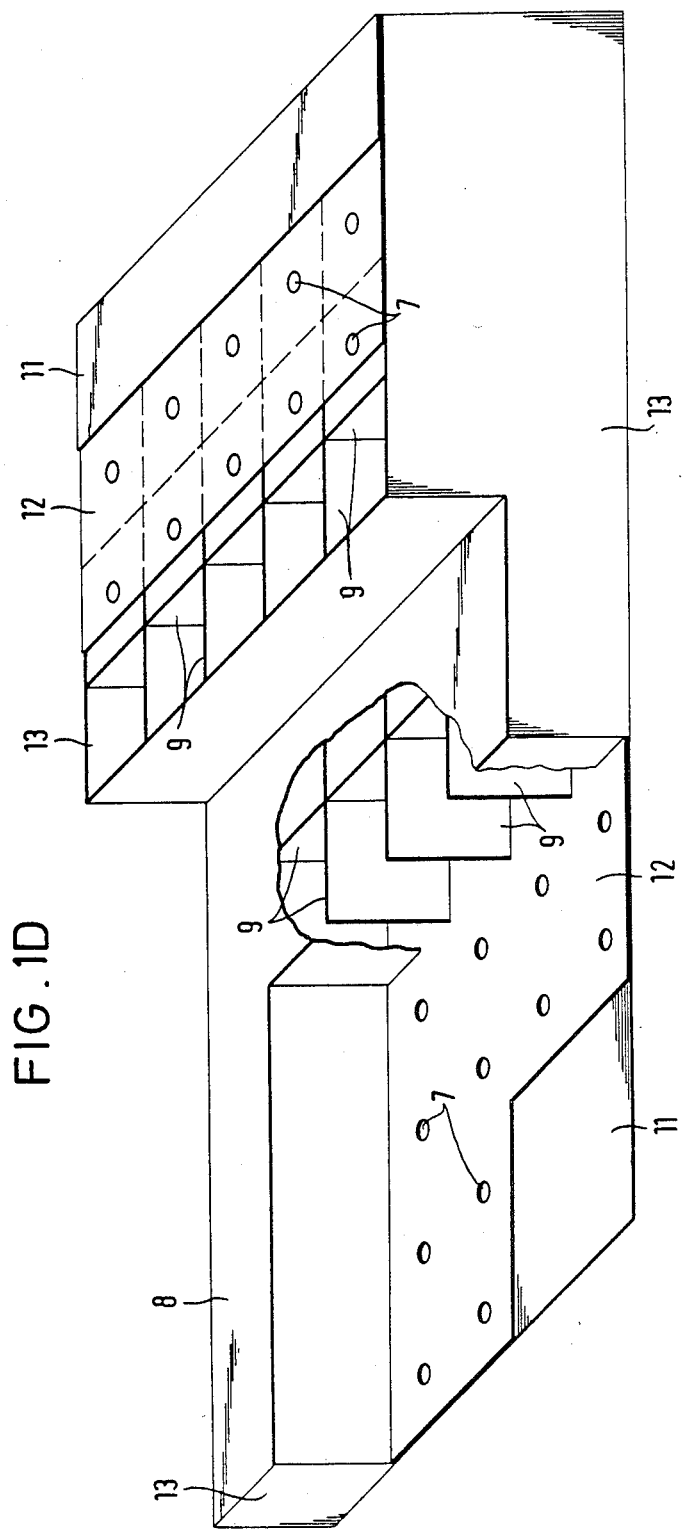

First, with reference to FIGS. 1 through 3, the layout of a particularly preferred embodiment of the inventive sound absorber box will be explained, whereby at first and with reference to FIG. 1A, one of the functional i.e. elemental units elements will be explained, of which the sound absorber box, shown in FIGS. 1, 2, and 3, is essentially composed in a multiplying arrangement, whereby modifications of the sound absorber box as per FIGS. 1, 2, and 3 will be explained more fully below, as far as details of the configurations are concerned.

The functional, i.e. elemental unit, of a sound absorber box, shown in FIG. 1A, is comprised of an all around closed chamber 2, which establishes a hollow cavity. This chamber 2 is bounded on one side by means of an outer plate 3 which can be stimulated to undergo vibrations in the audible frequency range. Moreover, the function and partial element includes an inner plate 4 which is arranged essentially parallel to the outer plate 3 inside of the hollow cavity of chamber 2, and thereby partitions that chamber into two partial cavities 5 and 6. These partial cavities 5 and 6 are interconnected only by a passage opening 7 in plate 4. This passage aperture together with the partial chamber 6, i.e. with that partial cavity which faces away from the outer plate 3, establishes a Helmholtz resonator tuned to oscillations in the audible frequency range.

Figure 9:
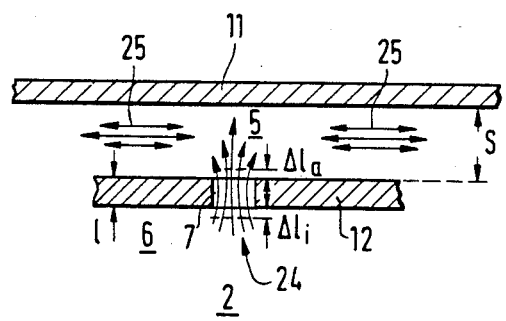
FIG. 9 is a schematic view through an aperture plate and a cover plate in the area of the passage opening of an inventive sound absorber box for illustrating the effectiveness of that sound absorber box.

Between the outer plate 3 and the inner plate 4, there is provided such a small distance S, so that the vibrations of the outer plate and of the Helmholtz resonator are, in fact, positively coupled through air or gas flows which are induced by vibrations of the outer plate 3, of the inner plate 4, as well as of the Helmholtz resonator in the intermediate space (chamber 5) between the outer plate 3 and the inner plate 4, as well as in the aperture 7. These gas or air flows are indicated in FIG. 9, and their positive coupling effect, on account of the small distance S is explained more fully below in connection with FIG. 9. Presently we refer to FIGS. 1, 2, and 3 which, as already mentioned, show a sound attenuator box 1 which is composed of a large number of function or partial elements of the type shown in principle in FIG. 1A:

The chambers 2 provided in the sound attenuator box establish two arrangements each comprised of a plurality of juxtaposed chambers 2, and which are combined in a kind of twin strata configuration. One of the strata of this twin strata arrangement, is the upper stratum in FIG. 1, and is composed of juxtaposed chambers 2, while the other stratum of this double strata arrangement in FIG. 1, is a lower stratum of juxtaposed chambers 2. The chambers of the two arrangements, or strata, of juxtaposed chambers 2, are interconnected in their respective rear, and in this particular embodiment, the connection is made such that the chambers 2, who face each other with their rear ends, will share a chamber bottom which is, in fact, established by a single planar bottom plate 8. Moreover, any respective two juxtaposed chambers 2 share side walls 9.

The bottom plate 8 and the side walls 9, as per the particular preferred embodiment of FIGS. 1, 2, and 3, establish a cell-like skeleton structure 10 which is by and in itself rigid and is akin to a honeycomb-like structure. This structure 10 can, for example, be stuck together from sheet parts or bonded, or welded together, or it can be of integral construction. It is of particular importance that the outer plate 3 of all laterally adjacent chambers 2 are established by a single piece cover plate 11 and that, moreover, the inner plates 4 of all laterally adjacent chambers is constituted by a common single piece aperture plate 12.

The plurality of chambers 2 of the sound attenuator box is embraced in a common frame 13 which, by means of flanges 14, grips around the edges of the cover plate 11 as well as the aperture plates 12, and by means of these flanges 14 the frame is connected tight with the cover plates 11. This way, the interior of the sound attenuator box 1 is flow medium tight sealed, against the environment by means of the cover plate 11 and the frame 13. The cover plate 11 has preferably a completely plain and smooth, and particularly preferably metallic outer surface. Moreover, the passage openings 7 can be provided with necks 15, facing away from the outer plate 3 or the cover plate 11, so as to establish a flow channel.

All parts, as they have been mentioned, particularly the outer plate 3 and the inner plate 4, i.e. the cover plate 11 and the aperture plate 12, as well as the skeleton structure 10 and the frame 13, can be made from the same material, particularly from s synthetic material or metal, so that difficulties, that may arise from different thermal expansion and different electrical potential, are avoided. Preferably, these parts can be made from aluminum or an aluminum alloy. The thickness of the outer plate 3, i.e. of the cover plate 11, and the thickness of the inner plate 4, i.e. the aperture plate 12, are preferably of the same order of magnitude. Moreover, this thickness is preferably smaller than the distance S between the outer plate, i.e. the cover plate, and the inner plate, i.e. the aperture plate. The inner, i.e. aperture plates 4 (12) are preferably dimensioned such that they can be stimulated to undergo vibrations in the audible frequency range, so that in connection with the hollow cavity resonator, coupled thereto, they contribute to the overall sound absorption.

As shown in FIGS. 1 and 3, the partial cavities of the chamber 2, as established between the aperture plate 12 and the bottom plate 8, are separated through the side walls 9. However, the partial chambers of the chambers 2, as situated between the cover plate 11 and the aperture plate 12, are not necessarily separated from each other, so that this way one obtains a very simple construction, whereby the cover plate 11 and the aperture plate 12 may possibly be kept spaced at a distance from each other by means of spacers or projections or the like, which are preferably placed in locations of any hypothetical extension of side walls 9 towards the respective cover plate 11.

The new sound attenuator box, which is suitable for insertion in flow channels, fulfills the general requirement made above and, as stated, also was the object of the invention, in really an ideal fashion:

Completely smooth cover plates 11 on both sides of the frame 13, which is likewise completely smooth, guarantee a minimum wall friction resistance and, therefore, as compared with the common sound attenuator elements, they make sure that any pressure loss can be reduced to an absolute minimum. Also, any deposits from the flow medium are now practically impossible. Under extreme dirty operating conditions as they may occur in flow channels, very simple cleaning is made possible through washing, spraying, dipping, of the entire sound attenuator box.

If, as is preferred, the frame 13 as well as all partitioning and stiffening side walls 9 and bottom plates 8 are of single piece construction, and if the aperture plate 12 and the cover plates 11 are made of metal, all conceivable requirements concerning protection against fire can be fulfilled also, any possible health requirements, are easily fulfillable. If the cover plates 11 are directly arranged in front of the aperture plates 12, particularly only a few millimeter, or tenth of millimeters therefrom, then a relatively small wall thicknesses already suffices in order to obtain a considerable high resistance against mechanical damage of the outer skin, which is essentially established by the cover plates 11. The outer skin, as well as the outer surfaces of the cover plate 11 and the frame 13, can be protected against chemical wear and corrosion similarly as the other walls of a flow channel. Therefore, the sound attenuator box as presently proposed can readily be incorporated without any problems in a venting or fluid conveying arrangement without introducing any incompatible or sensitive materials into the device, which could be carried along by the flow medium in case of damage to the sound attenuator.

The conventional sound absorbers cannot possibly be constructed in a skeleton fashion such as skeleton structure 10, but presently, this construction minimizes material strength requirements and still produces a maximum in stability with regard to pressure, thrust, and torsion wear. The conventional sound attenuator elements use also a frame such as 13 with a conventional circumscribing flange which is possibly equivalent to the flange 14, and may have width from 1–5 cm, preferably 2 cm. This incorporation permits that the mounting procedure can be carried out just as is conventional. The sound attenuator box presently proposed just as conventional sound attenuators can easily be transported, stacked, and assembled. Thus, in spite of their considerable advantages as compared with conventional sound attenuators, they are not any more difficult to transport, stack, or assemble. If the proposed sound attenuator box is homogeneously made from one and the same material, which is preferred, this box will behave quite uncritical, even in case of large temperature variations. Even icing over the smooth outer skin has no considerable reducing effect on the effectiveness on the sound attenuation process.

Since between, i.e. within, the skeleton structure 10, that is to say, on account of the preferably single piece construction, which is made up of the bottom plate 8 and the side walls 9, there remain only cavities forming the chambers 2 which do not have to be filled with any porous or fibrous material, the weight of the sound attenuator box presently proposed, can remain considerably below the weight of conventional sound attenuators, which are, for example, filled with mineral fibers. While the rule applies to conventional sound absorbers that they are no longer effective when their widths, i.e. depths is very small as compared with the length of a sound wave, this lower frequency limit is not applicable to the presently proposed sound attenuator box, so that under the same spacial considerationd, sound attenuator boxes, operating under the novel presently proposed principle, can be designed for much lower frequencies.

Figure 4A:
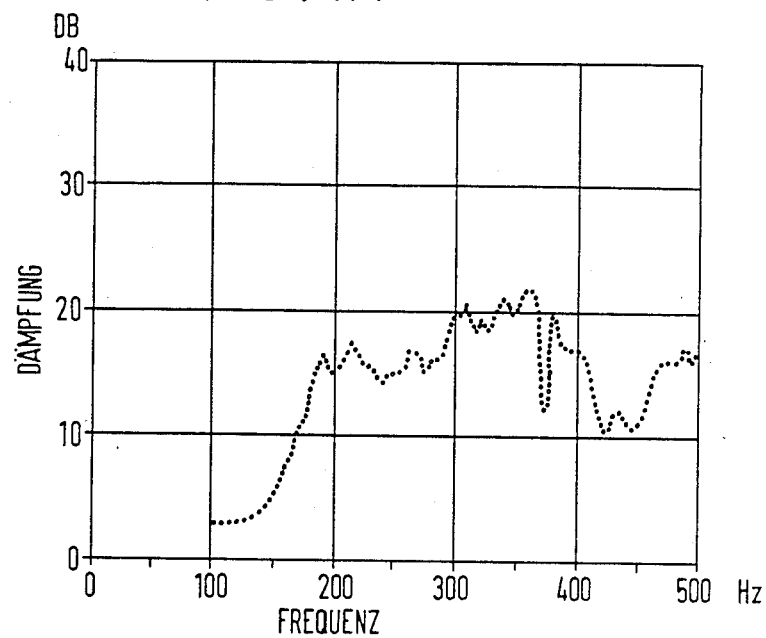
FIG. 4A is a diagram wherein the attenuation attained in a particular example of the inventive sound attenuator box is plotted in dependence upon frequency.
Figure 4B:
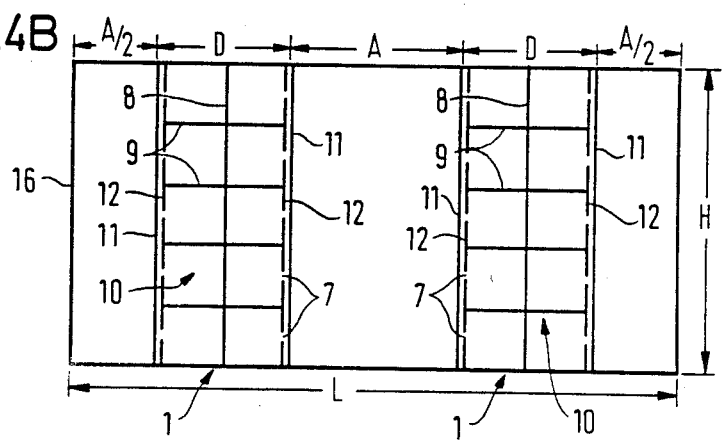
FIG. 4B is a sound attenuator box arrangement on the basis of which the attenuator curve of FIG. 4 had been measured, and that is in the cross-section, including the flow channel in which this sound attenuator box had been provided.

The attenuating curve illustrated in FIG. 4A, which resulted from a narrow band width measurement of attenuation by means of sound attenuator boxes of the kind shown in FIGS. 1 through 3, illustrate the sound attenuation which, as compared with conventional thinking, was unexpectedly high in the surprisingly broad frequency range between 150 and 500 cps with, on the average, 15 decibel attenuation by sound attenuator boxes having 1 meter length and for a D/H ratio (see FIG. 4B, illustrating and identifying these dimensions) of only 0.7. Here then it is to be taken into consideration that the attenuating characteristics of FIG. 4A is a randomly presented example which is not in the least optimized. Just by selecting the geometric parameters of the chambers 2 in accordance with any noise spectrum in the lower and medium frequency range, one can provide proper tuning. As far as particulars are concerned, FIGS. 4A and 4B are based on the following dimensional data for the sound attenuator boxes, and their positioning in a flow channel 16:

Bottom plate 8 and side walls 9 of the skeleton structure 11: aluminum sheet of 0.2 mm thickness.

The aperture plate 12: aluminum sheet of 0.1 mm thickness.

Cover plate 11: aluminum sheet of 0.1 mm thickness, placed directly in front of aperture plate 12.

The depths of the chambers 2, i.e. distance between bottom plate 8 and cover plate 11: 10 cm.

The volume of the chambers 2: each 1,000 ccm.

The diameter of each passage opening 7 (resonator aperture): 2 cm. Width D of the sound attenuator box: 20 cm. Height H of the sound attenuator box being also the cross-sectional height of the flow channel 16: 50 cm.

Cross-sectional length L of the flow channel 16: 100 cm. Distance A between sound attenuator boxes: 30 cm. Distance A/2 between a sound attenuator box and the closest wall of the flow channel 16: 15 cm.

Figure 5A:
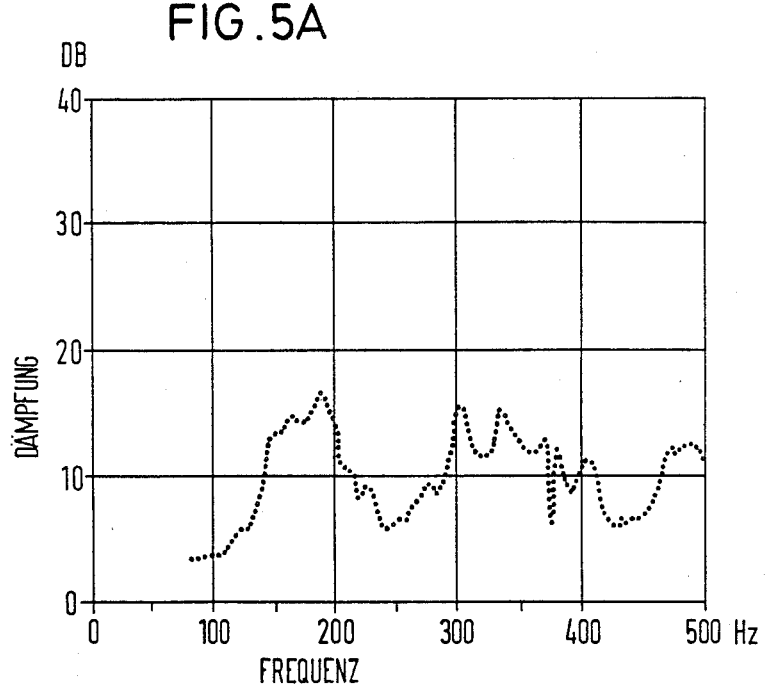
FIG. 5A illustrates an attenuation or curve corresponding to FIG. 4A whereby, however, the aperture plates in the inventive sound attenuator box on which this attenuation curve is based, include necks which extend the openings of the aperture plate in a flow channel-like fashion and are oriented away from the cover plates.

FIG. 5A illustrates that in the case a small neck is placed in front of every resonator passage opening 7, and, if one uses a somewhat thicker cover plate 11, one can obtain, for example, a shift of the attenuation drop towards lower frequencies. This, however, is at the expense of the attenuation for higher frequencies. The data of the sound attenuator boxes and their arrangement in the flow channel 16 are the same in FIGS. 4B and 5B, except that in FIG. 5B the cover plate 11 was made of aluminum sheet, having a thickness of 0.2 mm, adn the resonator neck 15 had a length of 2 cm.

Aside from the length of the resonator neck 15, the distance between cover plate 11 and aperture plate 12 plays an important part as far as tuning the sound attenuator box 1 is concerned. For example, it was found that for a distance between cover and aperture plates of 12 mm, a very strong attenuating maximum was obtained above 200 cps, which is situated in a relatively narrow frequency band well above the attenuation values shown in FIG. 5a. The resonator neck 15 is projecting into the chambers 2 to permit a shift of the maximum towards lower frequencies. However, in case all other parameters remain the same, the amplitude of the maximum drops likewise. This amplitude, however, is still sufficient in order to exceed by far the effectiveness of a conventional porous absorber at the lower frequencies. If, for example, a so-called blade tone is to be attenuated which dominates the noise spectrum of a blower at about 200 cps, and which, however, depends on the number of revolutions and the number of blades within the blower, then such sound attenuator box lends itself for placement directly behind the blower. However, without such a design which is attuned directly to the sound source, sound attenuators in accordance with the presently proposed new construction, can be designed so that at least in the extraordinarily important frequency range of up to 500 cps for the same construction depth, such a box will be unquestionably superior to all other marketed sound attenuators.

Figure 6A:
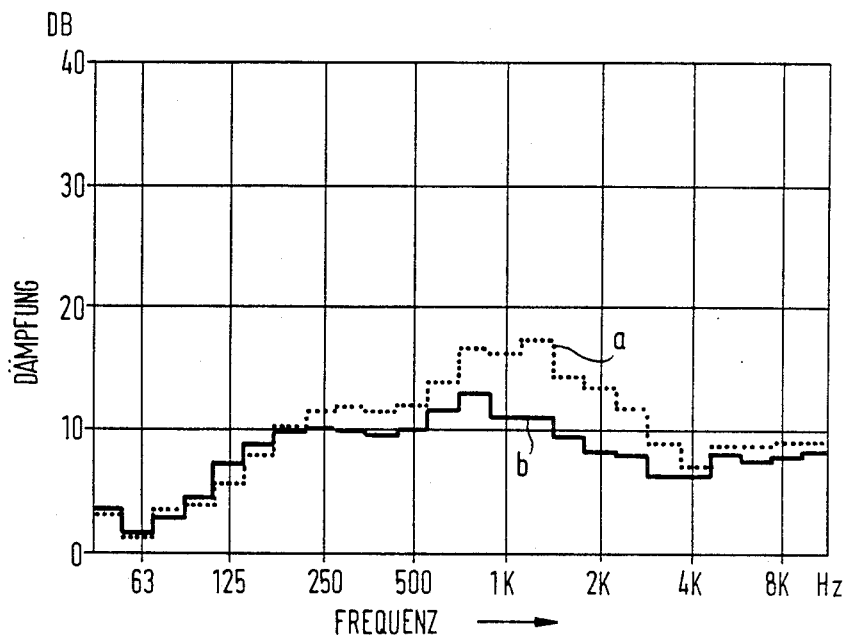
FIG. 6A illustrates curves indicating the attenuation in dependence upon the frequency of porous sound absorbers arranged similar and with dimensions similar to the inventive sound absorber in accordance with FIGS. 4B and 5B, whereby curve a relates to a porous sound absorber in a normal configuration, and curve b relates to a porous sound absorber, half of which is covered with sheet metal of half-a-millimeter thickness, and on opposite sides.
Figure 6B:
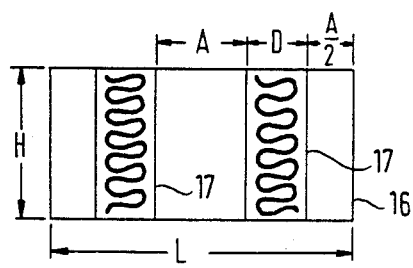
FIG. 6B is a illustration corresponding to FIGS. 4B and 5B of the device with porous sound absorbers, on the basis of which the attenuation curve of FIG. 6A was measured.

In order to have a comparison, a conventional porous sound attenuator was subject to measurements, and the result is shown in FIG. 6A. They were conducted by means of sound attenuating devices shown in FIG. 6B. The dimensions of the flow channels 16, as well as the outer dimensions of the two conventional, porous sound absorber 17B, as shown in FIG. 6B, and their distances are the same, as was shown with reference to FIG. 4B so that, in this way, a direct inaccurate comparison is permitted between the effectiveness of the novel sound attenuator box and of a conventional porous sound absorber, directly on the basis of the curves in FIGS. 4A and 5A, on one hand, and FIGS. 6A on the other hand.

The dotted curve a in FIG. 6A is a sound absorption curve of a conventional sound absorber stuffed with mineral fibers with a density of about 40 kg/cbm. The absorption of this conventional absorber is considerably poorer in the important range between 100 and 500 cps as compared with the sound absorber box presently proposed, configured, and arranged in accordance with FIGS. 4B and 5B, as can be seen by comparing the curve a of the FIG. 6A with the curves of the FIGS. 4A and 5A.

It is, however, to be considered that in accordance with the description given above in the introduction, sound attenuators of this configuration are not directly usable in all instances. In order, for example, to avoid the penetration of moisture into the mineral fibers, it is absolutely necessary to weld the mineral wool filling into a bag of plastic foil of 50 to 500 micro meter thickness. This requirement, however, causes a deterioration of the sound absorption. For example, in the octave between 500 and 1000 cps, the absorption (attenuation) may even drop to half the value without a bag. If one wants to protect the foil itself against damage so that the interior of the foil bag will not, for example, become a breeding ground for bacteria, then one has to cover the entire surface, for example, through an aperture sheet. If the aperture area of that is at least 30% of the sheet surface, then one knows that such a cover is acoustically, practically without any influence, but there is the danger that the foil does not remain limp, rather, and depending on the kind of filling, the foil will be forced against the cover more or less strongly, and thereby tensioned. This then, in fact, has a very negative effect on the attenuation of medium and lower frequencies as could be ascertained through measurements. Even if the foil is held completely limp between two aperture plates, one still cannot maintain the original attenuation of a conventional porous absorber in the middle frequency range. Aside therefrom, in case of any chemical agression, the use of plastic foils is actually to be excluded.

In the case of strong mechanical load on account of the adjacent fluid flow or in case of shocks, changes in the position of the porous material has to be avoided in such conventional porous sound absorbers 17. Here then it may be necessary to subdivide the absorber itself. This cassette-like dividing, however, introduces a further deterioration in the attenuation at lower frequencies, which is not very high to begin with. Even if no further demands are made as they were announced above in the object statement, sitll one can see that the conventional porous sound absorber is obviously hardly suitable for a risk free design at 250 cps or lower.

Figure 7A:
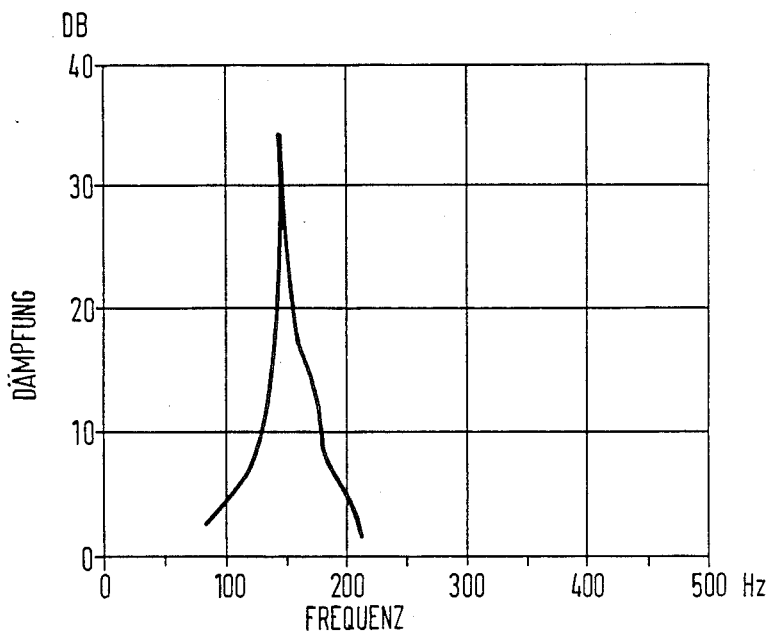
FIG. 7A illustrates a curve depicting the attenuation of plate absorbers in dependence upon frequency.
Figure 8A:
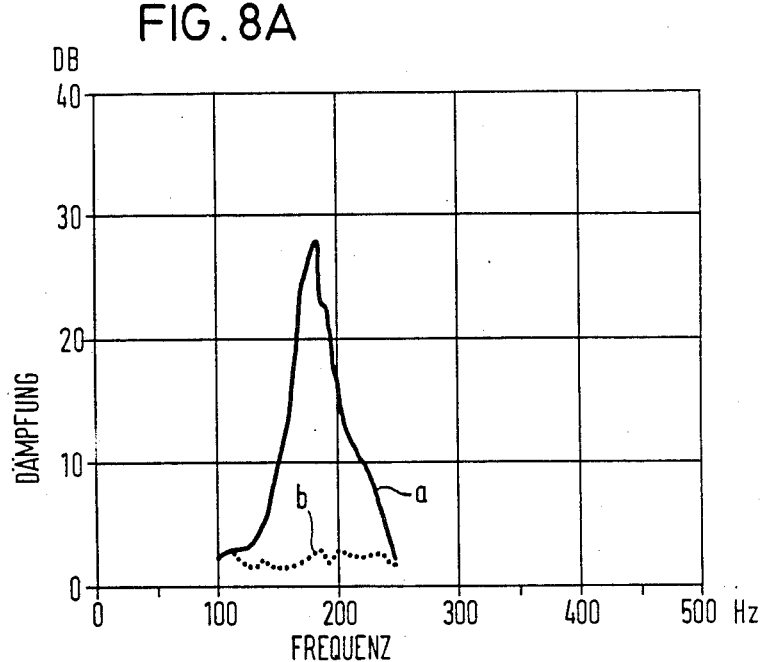
FIG. 8A illustrates two curves, wherein the attenuation of a Helmholtz resonator with free openings is compared with a resonator with closed openings, both in dependence upon frequency.

Tests with plate resonators were conducted for comparison, and their result is shown in FIG. 7A. A further comparison was made with a regular Helmholtz resonator, and the results are shown in FIG. 8A. These results show that the effectiveness of the sound attenuator box as proposed here is by no means the result of adding the effectiveness of ae plate resonator to the effectiveness of a regular Helmholtz resonator, rather it is believed that a synergistic effect is produced, which goes well beyond the mere addition of plate and Helmhltz resonators.

Figure 7B:
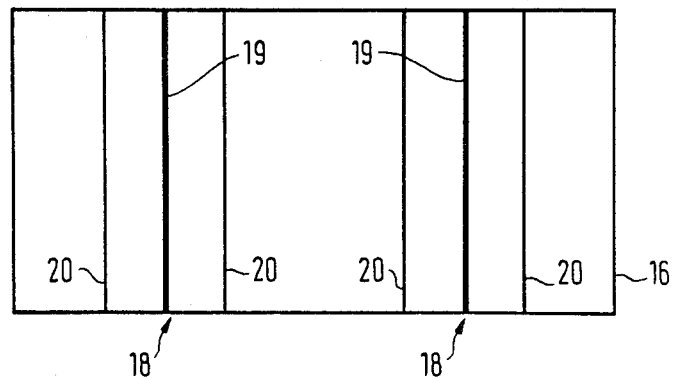
FIG. 7B is an illustration of the arrangement and device of these plate absorbers in a manner and mode of illustration corresponding to FIGS. 4B, 5B, and 6B.
Figure 8B:
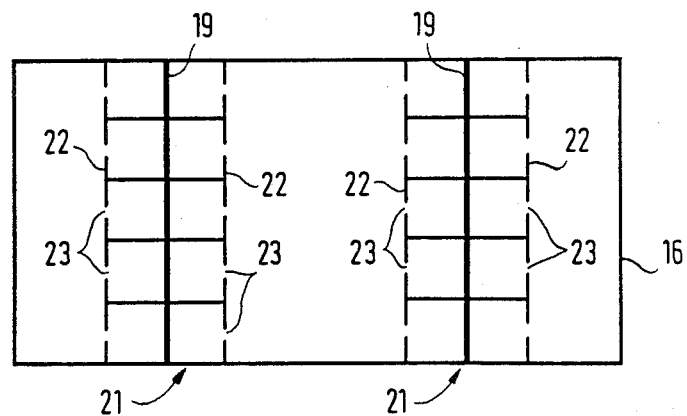
FIG. 8B is an illustration of the arrangement and configuration of Helmholtz resonators in accordance with which the attenuation curves of FIG. 8A was obtained and the illustration correspond to that of FIGS. 4B, 5B, 6B, and 7B.

Before we turn to FIG. 7A and 7B, as well as 8A and 8B as far as details are concerned, it should be pointed out that the dimensions of the flow channels 16 and the outer dimension of the plate resonator, and of the regular Helmholtz resonator, in accordance with FIGS. 7B and 8B, as well as the distances between these resonators among each other, and to the adjacent walls of the flow channels 16, are always the same, as was indicated in connection with FIG. 4B above, whereby the symbols for these dimensions, i.e. the spacings A, A/2, D/H and L, are not included for reasons of simplifying illustration in FIGS. 7B and 8B because they can be derived directly by comparison with FIG. 4B.

The plate absorber 18, in accordance with FIG. 7B is comprised of a center plate 19 in addition to the not illustrated frame; this plate 19 was a 13 mm thick wooden clamping plate. In addition, resonator plates 20 were placed on both thereof, and in 10 cm distance, which plates in the present case, consisted of aluminum sheets having a thickness of 0.6 mm. As shown in FIG. 7A, such a plate resonator is effective only in a very narrow frequency range which extends just a little to both sides of a resonance frequency of 147 cps.

The Helmholtz resonator 21 in accordance with FIG. 8B were used to obtain the curves as shown in FIG. 8A. The middle plate 19 was also a 13 mm thick press-force clamping plate, additionally aperture plates 22, were used of aluminum sheet having a thickness of 0.6 mm, and resonator apertures 23 were provided at a diameter of 1 cm. The depth of the individual chambers, i.e. the distance between the aperture plates 22 and the respective center plate 19, was 10 cm, and the volume of the individual chambers was 1000 ccm. Finally, the corrected thickness of the aperture plates 22 in the range of the resonator aperture 23, was 0.8 cm. This corrected thickness which is identified by 1*, will be explained in conjunction with FIG. 9, and takes in flow in the immediate vicinity of the resonator aperture into consideration, i.e. the air or gas outside of the resonator aperture, depending upon the resonator aperture geometry, will osciallate slightly differently.

The curve a in FIG. 8A which was measured using the device as per FIG. 8B with open resonator apertures 23 shows a typical narrow band attenuation characteristics. The maximum of the attenuation is at 170 cps. If one closes the resonator openings 23 by means of adhesive tape or the like one obtains the curve b of FIG. 8A, so that only a very small overall attenuation results, and in the entire maximum of the curve a vanishes. For reasons of completion, it should be added that Helmholtz resonators as shown in FIG. 8B have primarily the disadvantage that they have open hollow cavities as result of which they soil, and will produce their own noise on account of the passing flowing.

Figure 5B:
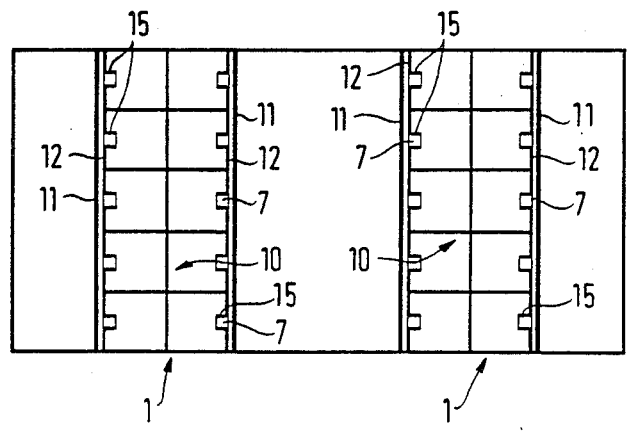
FIG. 5B shows sound attenuator box arrangements and configurations on the basis which measuring results of FIG. 5A have been obtained.

Even though, it has to be taken into consideration that the resonator plate 20 of the device as per FIG. 7B, and the aperture plates 22 of the device in accordance with FIG. 8B, have a larger thickness than in the cover plates 11 and the aperture plates 12 of the devices shown in FIGS. 4B and 5B, on comparing the curves shown in FIGS. 4A and 5A, on one hand, and the curves of FIGS. 7A and 8A, on the other hand, one can basically recognize that the new sound attenuator box as presently proposed, establishes a completely unexpectedly, very broad band operating sound attenuating absorber very well suited for very low as well as for higher frequencies; this is not explicable by the mere addition of the curves shown in FIGS. 7A and 8A, and, therefore, was not to be expected.

In view of the curve b of FIG. 8A, and in further view of flow dynamic or mechanical considerations, one would expect that a cover of a resonator and passage opening 7 of the aperture foil 12 by means of cover foil 11, as carried out in the new presently proposed sound attenuator box, would lead to the fact that complete suppression of any air vibrations in the resonator and passage opening 7. If, however, one were to use a foil placed in larger distance for purposes of cover, one would expect that this foil in order to permit the sound to unimpededly enter the Helmholtz resonator, have to be very thin, namely a thickness from 6–10 micro meter, but that practice would be prohibitive in practice on account of the considerably larger sensitivity of such a foil against damage.

The present invention relies on the surprising discovery that a cover plate 11, which is more or less directly placed above the aperture plate 12 of a Helmholtz rensonator (see FIG. 9) will not impede vibrations and the accompanying back and forth flow currents 24 in the passage openings 7 of the plate 12, but will lead to a positive coupling between the osciallations of the Helmholtz resonator and the vibrations of the cover plate 11, whereby air currents 25 obtain which essentially run parallel to the aperture and cover plates 12 and 11. Owing to this coupling, the cover plate 11 and, possibly, the aperture plate 12 to the extent it is excitable to undergo vibrations in the audible frequency range, will be positively stimulated to a plurality of oscillation in the audible range and in the vicinity of the aperture and resonator aperture 7. On the basis thereof one obtains the broad frequency spectrum of effective attenuation as shown in FIGS. 4A and 5A.

Since the effective length 1* of aperture 7 on the basis of which the resonance of a Helmholtz resonator can be calculated, results additively from the actual length 1 and the quantities delta li and delta la, the latter two values being final corrective values, which symbolize the air that follows the osciallation outside of the apertures 7 which oscillations are different to some extent depending upon the geometry involved. On account thereof, the distance S between the cover plate 11 and the aperture plate 12 should preferably be actually smaller in the inventive sound attenuating box or at the most equal to delta la, because then a particular strong coupling obtains between the vibrations of the cover plate 11 and the aperture plate 12.

Analogously, and preferably, the distance S should be smaller or equal to the diameter of the opening 7 whereby this diameter is equal to the slot width, if opening 7 is of slot-shaped configuration. Finally, in another preferred embodiment of the inventive sound attenuator box, the distance S is chosen to be smaller or equal to one quarter of the depth of the chamber 2, i.e. of the distance between plate 11 and bottom plate 8.

One of the most important and surprising results of investigations that lead to the present invention, is directed to the point that a cover plate placed immediately in front of an opening in an aperture plate, and is not too thick, will not impede pulsations of the air conditioned in the chamber through the opening but will lead to a synergistically significant increase in the frequency spectrum and of the integral value of the sound attenuation.

The sound attenuator box proposed in accordance with the invention, and as far as its basic configuration is concerned, and/or in one or the other of the preferred embodiments offers the following advantages.

First, each sound attenuator box is closed all around as against an outside flow medium, in that an outer skin is provided which renders completely impossible any penetration of gasious, liquidous, or solid material from the flowing medium.

Second, the outer surfaces being arranged parallel to the flow, as well as to predominant direction of sound propagation, offer the lowest possible friction resistance to the flow on account of a completely plane and smooth, preferably metallic surface.

Third, the outer skin of the sound attenuator box is protected against chemical and mechanical damage.

Fourth, a plane aperture plate is arranged immediately behind the plane outer cover such that particularly in the vicinity of the opening of the aperture plate, a narrow gap remains so that the two plates are in contact at best in some places.

Fifth, both plates, i.e. aperture plate and cover plate, preferably have a thickness of the same order of magnitude, being preferably smaller than the thickness of the airgap in between them.

Sixth, the aperture plate being on the inside is fastened to a skeleton structure, being, for example, of cell-like (honeycomb) configuration which is not amenable to vibrate, i.e. it is acoustically rigid, so that only closed cavities obtain which are open only through an opening towards the intermediate space between the aperture plate and the cover plate.

Seventh, the cover plate and the aperture plate, each by itself, or together are excited for vibrating together with an air cushion established by the hollow cavities, the excitation occurring through sound waves that run in channels established by and between the parallely arranged sound attenuator boxes.

Eight, the air plug in the openings undergo osciallations together with air adjacent to the openings and being narrowly tightly enclosed in the gap or space between the cover plate and the aperture plate, being coupled and causing to follow a part of the cover plate as well as the adjacent air cushion.

Ninth, the frequency range of the various oscillations characteristics is preferably in the range under 500 cps, particularly and preferably between 100 and 500 cps.

Tenth, the frequency range of the attenuation is adjustable through selection of the geometric parameters and of the material property parameters, in both areas and towards very different kinds of noise spectra.

Eleventh, the cover plate may be fastend along the skeleton or honeycomb structure, for example, by means of adhesive bonding, and particularly may exhibit protrusion with adhesive points.

Twelvth, the sound attenuator box is actually suitable for practically all tasks of sound attenuation in flow channels. It guarantees optimized attenuation of sound in the direction in which the medium is caused to flow in these flow channels.

The sound attenuator box uses, inter alia, the following previously unused resonance and annuating mechanisms:

a. The vibrations of the plane cover plate together with the aperture plate directly behind the cover plate, having a wall thickness which is of comparable order of magnitude.

b. Vibrations of the tube plates or of parts thereof in relation to each other.

c. Vibrations of the tube plates or of parts thereof in relation to each other.

d. Pulsations of the air cushion established between the two plates, particularly in the vicinity of the apertures.

The desired large band width can be obtained through a certain width in the variation of geometric parameters in the interior of the sound attenuator box. Particularly, it should be emphasized that the shape of the apertures and possibly added on neck offer themselves as easily variable means for optimizing and matching the effectiveness of the box. Moreover, the arrangement of the aperture plate and of the cover plate to each other and the kind of contact making between them or now they are interconnected in certain places, offer the possibility of making a sound absorber of large band width.

If one wants to construct an extremely light weight sound attenuator box, the skeleton walls, as well as the cover and aperture plates can be constructed from considerably smaller width, e.g. considerably smaller wall thickness. Then, however, a part of the effectiveness shifts to higher frequencies. Since the planar, skeleton defining bottom plate 8 is situated in the plane of symmetry of the box considering normal excitation conditions in the channels, this plate 8 cannot become acoustically effective. Therefore, one may in same cases eliminate that plate.

Contrary to all known absorber elements, cassettes, bars, so-called under-surface construction, etc., the sound attenuator box as proposed here, does not need fibrous or porous material. Since the internal attenuation is very low in the thin plates as well as in the large air chambers, the sound attenuator box is designed so that the losses are in effect produced through artificially increased wall and boundary layer friction mechanisms. This, however, does not completely exclude that, whenever it appears to be acoustically sensible and technically realizable, one uses the known methods for attenuating the cavities in Helmoltz resonators or for attenuating plates vibrations in addition to the inventive features.

The invention is not limited to the embodiments described above, but all changes and modifications thereof, not constituting departures from the spirit and scope of the invention are intended to be included.

We claim:

1. A sound attenuator box, particularly for attenuating sound waves in an audible range propagating in flow channels, such as venting channels, and including:

(a) at least one enclosed chamber forming, a hollow cavity and being bounded to one side by means of an outer plate excitable to undergo vibrations in the audible range; and (b) at least one inner plate which is arranged essentially parallel to the outer plate inside the hollow cavity of the chamber, and partitioning the hollow chamber into two partial first and second follow chambers, which are interconnected exclusively through a passage opening in the inner plate, said passage opening together with the first partial cavity facing away from said outer plate establishing a Helmholtz resonator tuned to osciallations in the audible frequency range; the improvement comprising:

said inner plate, said first and second partial chambers, and said outer plate constituting a vibrating entity, oscillating in the audible range;

said outer plate being of an unperforated, impermeable configuration;

there being such a small distance (S) between said inner plate (4) and said outer plate (3), so that the vibrations of the outer plate (3) and of the Helmholtz resonator are positively coupled by means of oscillation induced air or gas currents in said second partial chamber between the outer plate (3) and the inner plate (4) as well as said passage opening (7).

2. Sound attenuator box in accordance with claim 1, having a plurality of said chambers in juxtaposed position, characterized in that respective outer plates (3) of several juxtaposed chambers (2), are established by a common single piece cover plate.

3. Sound attenuator box in accordance with claim 1, having a plurality of juxtaposed chambers, characterized in that internal plates (4) of several laterally juxtaposed chambers (2) are constituted by a common single piece aperture plate (12).

4. A sound attenuator box in accordance with claim 1, further comprising a plurality of juxtaposed chambers (2), said plurality of chambers being combined in a twin strata arrangement wherein the chambers (2) of one of said twin strata are interconnected to the chambers (2) of the other of said twin strata at a rear portion of said chambers (2) and providing a common bottom between chambers (2) of said twin strata.

5. Sound attenuator box in accordance with, claim 1, characterized in that all parts of the sound attenuator box (1) are made of the same material.

6. A sound attenuator box as in claim 5, said material being a synthetic.

7. A sound attenuator box as in claim 5, said material being metal.

8. A sound attenuator box as in claim 5, said metal being aluminum or an aluminum alloy.

9. Sound attenuator box in accordance with claim 1, characterized in that said passage opening is provided with a neck facing away from said cover plate and constituting a flow channel.

10. A sound attenuation box comprising:

a plurality of juxtaposed hollow chambers each having a rear wall, a bottom, side walls, an unperforated, impermeable front-outer plate means, and a partition extending between the side walls parallel to the outer plate means;

said partition having an opening by means of which portions of the chamber as partitioned by the partition communicate;

said partition being capable of undergoing vibrations, a portion of each chamber being defined by the partition so that the partition, the outer plate means, and a space in-between are also capable of undergoing oscillation in the audible range;

the bottom as well as the opening being a Helmholtz resonator for frequencies in the audible range; and said partition having a spacing from the outer plate means to positively couple the Helmholtz resonator to the vibrations which the outer plate means undergo.

11. A sound attenuation box as in claim 10, wherein the outer plate means of at least some laterally juxtaposed chambers are defined by a common single piece plate.

12. A sound attenuation box as in claim 10, wherein said partitions of at least some laterally juxtaposed chambers are established by a common, single piece aperture plate.

13. A sound attenuation box as in claim 10, wherein at least some juxtaposed chambers share common side walls.

14. A sound attenuation box as in claim 10, including a first plurality of laterally juxtaposed chambers arranged in a first stratum, and a second plurality of laterally juxtaposed chambers arranged in a second stratum, the two strata being placed back to back.

15. A sound attenuation box as in claim 14, wherein chambers being placed back to back and pertaining to different strata share a common bottom.

16. A sound attenuation box as in claim 15, wherein said two strata share a common single piece bottom plate.

17. A sound attenuation box as in claim 10 and including a common frame for all said chambers, said frame sealing all said chambers fluid-tight.

18. A sound attenuation box as in claim 11, said common outer plate having a smooth outer surface.

19. A sound attenuation box as in claim 18, said outer plate being made of metal.

20. A sound attenuation box as in claim 10, wherein said plates as well as partitions separating laterally juxtaposed chambers as well as the bottoms and the side walls of the chambers are made of the same material.

21. A sound attenuation box as in claim 20, said material being a synthetic, aluminum or an aluminum alloy.

22. A sound attenuation box as in claim 10, said outer plate means and said partition each have a thickness not exceeding said spacing.

23. A sound attenuation box as in claim 10, wherein each of the openings has a neck facing away from the outer plate means, towards the bottom.

24. A sound attenuation box as in claim 11, said common plate being excitable to vibration in the audible frequency range.

25. A sound attenuation box as in claim 12, said aperture plate being excitable to vibrate in the audible frequency range.

26. A sound attenuation box as in claim 21, said plates having a thickness between 0.03 to 0.6 millimeter

* * * * *